Feb. 13, 1934.  W. W. GAIRING  1,946,684

LATHE CENTER

Filed June 12, 1930

INVENTOR
Walter W. Gairing
BY Chappell Earl
ATTORNEYS

Patented Feb. 13, 1934

1,946,684

UNITED STATES PATENT OFFICE 1,946,684

LATHE CENTER

Walter W. Gairing, Kalamazoo Township, Kalamazoo County, Mich., assignor to Nielsen, Inc., Lawton, Mich.

Application June 12, 1930. Serial No. 460,564

3 Claims. (Cl. 82—33)

The main objects of this invention are:

First, to provide an improved lathe center in which the spindle is supported so that it is free from chatter and vibration and capable of carrying heavy loads.

Second, to provide a structure having these advantages which is very simple in its parts and in the assembly.

Objects pertaining to details and economies of my invention will definitely appear from the description to follow. The invention is defined in the claims.

A structure which embodies the features of my invention is illustrated in the accompanying drawing, in which.

Figure 1:
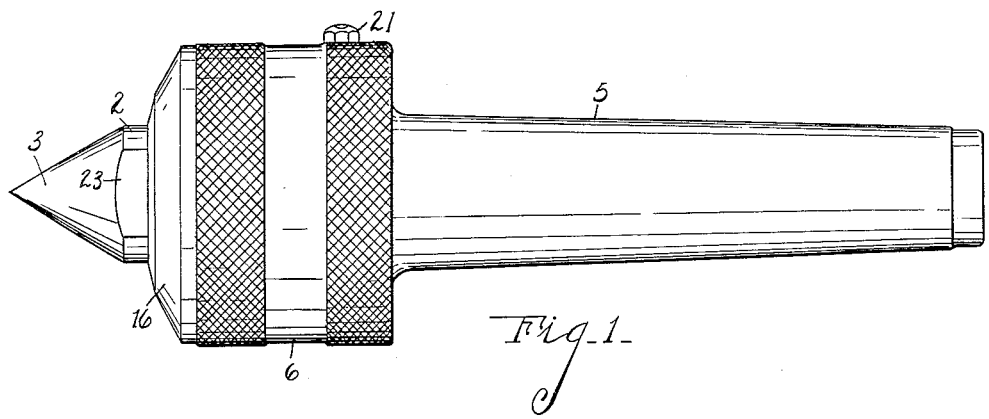
Fig. 1 is a side view of my improved lathe center.
Figure 2:
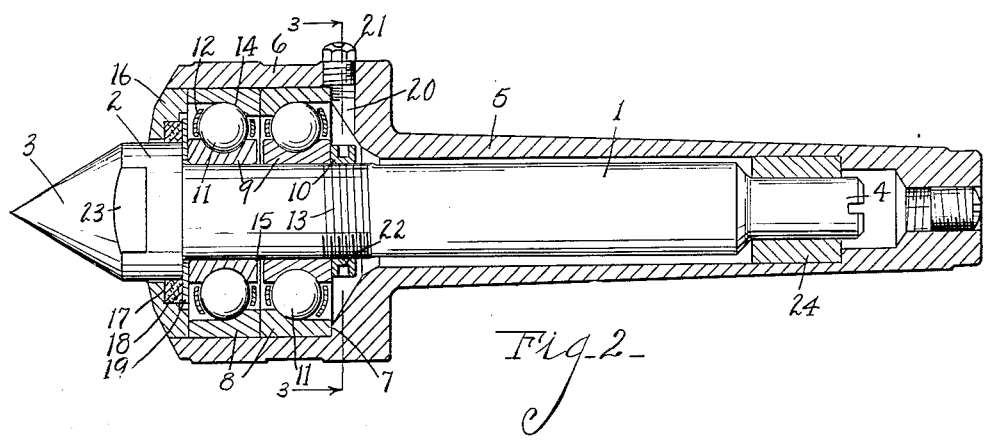
Fig. 2 is a longitudinal section on line 2—2 of Fig. 3, the spindle and the anti-friction bearing elements being shown in full lines.
Figure 3:
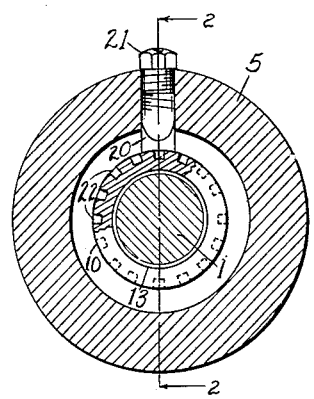
Fig. 3 is a transverse section on line 3—3 of Fig. 2.

Referring to the drawing, my improved lathe center comprises a spindle 1 having a cylindrical head 2 terminating in a conical tip 3.

At its inner end the spindle has a reduced bearing portion 4. The holder 5 is provided with a chambered head portion 6 shouldered at 7 to provide a seat for one of the outer bearing members 8.

The inner bearing members 9 are arranged on the spindle with one of them in supporting engagement with the thrust collar 10. The balls 11 are provided with cages 12.

The spindle 1 is provided with a threaded portion 13 for the thrust member 10 so that it may be adjusted thereon.

It will be noted that the ball races 14 of the outer bearing members are cut away on opposite edges; that is, the walls thereof are tangential to the curve of the races which permits the ready assembling of the parts. These outer members are arranged as shown in the drawing so that by adjusting the thrust collar 10 on the spindle the adjacent inner bearing member is moved inwardly, tending to close the space indicated at 15, carrying the balls 11 against the curved bearing surface of the outer race taking up any slack in the bearing.

It will be noted that the outer members are oppositely disposed and the thrust of the outer bearing member against the adjacent bearing member takes up any slack that may be in the second bearing.

The closure 16 is a pressed fit in the holder head and this is provided with a seat 17 for the packing ring 18, this ring being supported by a retaining ring 19 arranged between the adjacent inner bearing member and the head of the spindle.

The holder is provided with an oil opening 20 having a closure 21, this oil opening also serving to permit the introduction of a tool to engage one of the radial holes 22 in the thrust collar 10.

The head of the spindle is flattened at 23 to receive a wrench so that by holding the thrust collar and applying a wrench to the spindle the bearings may be very accurately adjusted.

The bearing portion 4 of the spindle is provided with a radial bearing 24.

With the parts thus arranged they may be quickly assembled and the bearing very accurately adjusted to receive the radial and thrust load and to eliminate chatter and vibration.

Having thus described my invention, what I claim as new and desire to secure by Letters Patent, is:

1. A lathe center comprising a spindle having a cylindrical head portion provided with a conical tip at its outer end and a radial bearing portion at its inner end, said spindle having a collar threaded for adjustment thereon and disposed in spaced relation to said head, a holder comprising an internally shouldered head portion and a tubular shank portion, a pair of main radial and thrust bearings arranged in said head portion of said holder and each comprising an inner bearing member arranged on said spindle, an outer bearing member within said holder head and coacting bearing balls, the outer bearing members being in edge to edge abutting relation, one of the inner bearing members being in supporting engagement with the head of the spindle and the other with said adjustable collar, said inner bearing members being normally spaced apart so that they are longitudinally adjustable by means of said collar to take up slack in said bearings, and a closure for said holder head provided with a packing coacting with the head of said spindle, said holder having an opening therein through which a tool may be engaged with said collar.

2. A lathe center comprising a spindle having a cylindrical head portion provided with a conical tip at its outer end and a radial bearing portion at its inner end, said spindle having a collar threaded for adjustment thereon and disposed in spaced relation to said head, a holder comprising an internally shouldered head portion and a tubular shank portion, a pair of main radial and thrust bearings arranged in said head portion of said holder and each comprising an inner bearing member arranged on said spindle, an outer bearing member within said holder head and coacting bearing balls, the outer bearing members being in edge to edge abutting relation, one of the inner bearing members being in supporting engagement with the head of the spindle and the other with said adjustable collar, said inner bearing members being normally spaced apart so that they are longitudinally adjustable by means of said collar to take up slack in said bearings, a closure member in supporting engagement with the adjacent outer bearing member, and a radial bearing in said shank portion of said holder coacting with the inner bearing portion of said spindle, said holder having an opening therein through which a tool may be engaged with said collar and a plug filling said opening when not in use.

3. A lathe center comprising a spindle having a cylindrical head portion provided with a conical tip at its outer end and a radial bearing portion at its inner end, said spindle having a collar threaded for adjustment thereon and disposed in spaced relation to said head, a holder comprising an internally shouldered head portion and a tubular shank portion, a pair of main radial and thrust bearings arranged in said head portion of said holder and each comprising an inner bearing member arranged on said spindle between said head and collar, an outer bearing member arranged within said holder head and coacting bearing balls, the outer bearing members being in edge to edge abutting relation, one of the inner bearing members being in supporting engagement with the said adjustable collar, said inner bearing members being normally spaced apart so that they are longitudinally adjustable by means of said collar to take up slack in said bearings, and a closure for the outer end of said holder head embracing the head of said spindle, the head of said holder at the outside of said spindle being adapted to receive a tool, and said holder having an opening therein through which a tool may be engaged with said collar.

WALTER W. GAIRING.